(12) United States Patent
Needleman et al.

(10) Patent No.: US 12,354,272 B2
(45) Date of Patent: Jul. 8, 2025

(54) AUTOMATED ANALYSIS AND SELECTION OF HUMAN EMBRYOS

(71) Applicants: PRESIDENT AND FELLOWS OF HARVARD COLLEGE, Cambridge, MA (US); ICHILOV TECH LTD., Tel-Aviv (IL)

(72) Inventors: Daniel Needleman, Somerville, MA (US); Hanspeter Pfister, Arlington, MA (US); Yu Yang, Cambridge, MA (US); Won-Dong Jang, Cambridge, MA (US); Brian Leahy, Cambridge, MA (US); Dalit Ben Yosef, Tel Aviv (IL)

(73) Assignees: PRESIDENT AND FELLOWS OF HARVARD COLLEGE, Cambridge, MA (US); ICHILOV TECH LTD., Tel-Aviv (IL)

( * ) Notice: Subject to any disclaimer, the term of this patent is extended or adjusted under 35 U.S.C. 154(b) by 251 days.

(21) Appl. No.: 17/333,423

(22) Filed: May 28, 2021

(65) Prior Publication Data
US 2022/0383497 A1 Dec. 1, 2022

(51) Int. Cl.
*G06T 7/11* (2017.01)
*G06T 7/00* (2017.01)

(52) U.S. Cl.
CPC ............... *G06T 7/0016* (2013.01); *G06T 7/11* (2017.01); *G06T 2207/10056* (2013.01); *G06T 2207/20081* (2013.01); *G06T 2207/20084* (2013.01); *G06T 2207/30024* (2013.01)

(58) Field of Classification Search
None
See application file for complete search history.

(56) References Cited

U.S. PATENT DOCUMENTS

| | | | |
|---|---|---|---|
| 10,902,334 B2 * | 1/2021 | Letterie | G06F 18/214 |
| 11,210,494 B2 * | 12/2021 | Chan | G06N 3/045 |
| 2008/0032325 A1 * | 2/2008 | DiMarzio | G02B 21/18 |
| | | | 359/368 |

(Continued)

OTHER PUBLICATIONS

Cecchele et al., "Cellular and Molecular Nature of Fragmentation of Human Embryos," Int. J. Mol. Sci. 2022, 23, 1349. https://doi.org/10.3390/ijms23031349.

*Primary Examiner* — Tsung Yin Tsai
(74) *Attorney, Agent, or Firm* — Morgan Lewis & Bockius LLP

(57) ABSTRACT

Embodiments described herein use deep learning to automate measurement of key morphokinetic embryo features associated with viability and quality, in particular those relevant for clinical in-vitro fertilization (IVF). Systems and methods may, for example, acquire one or more digital images of one or more embryos; select one or more embryos in each digital image; and for each selected embryo, (i) computationally characterize the zona pellucida, detect the degree of fragmentation in the embryo, and for each embryo with a low fragmentation score, computationally classify the embryo's developmental stage based on whether cells constituting the embryo exceed a threshold number (e.g., nine). For an embryo consisting of a single cell, pronuclei may be detected and counted. Based on these measurements, a viability score may be assigned to the embryo.

22 Claims, 3 Drawing Sheets

(56) References Cited

U.S. PATENT DOCUMENTS

| | | | |
|---|---|---|---|
| 2012/0196316 A1* | 8/2012 | Sebesta | C12M 41/14 435/29 |
| 2013/0184518 A1* | 7/2013 | Zarnescu | A61B 17/435 600/34 |
| 2019/0042958 A1* | 2/2019 | Letterie | G06V 20/698 |
| 2020/0125818 A1* | 4/2020 | Chan | G06N 3/045 |
| 2021/0249135 A1* | 8/2021 | Rimestad | G06T 7/33 |
| 2022/0198657 A1* | 6/2022 | Hall | G06T 7/136 |

* cited by examiner

AUTOMATED ANALYSIS AND SELECTION OF HUMAN EMBRYOS

STATEMENT REGARDING FEDERALLY SPONSORED RESEARCH OR DEVELOPMENT

This invention was made with government support under 1835231 awarded by the National Science Foundation, and CA225088 awarded by the National Institutes of Health. The government has certain rights in the invention.

FIELD OF THE INVENTION

The present invention relates, generally, to in-vitro fertilization (IVF), and in particular to evaluation of embryos for viability and quality.

BACKGROUND

As many as one in six couples worldwide suffer from infertility. Many of those couples seek to conceive via IVF, in which a patient is stimulated to produce multiple oocytes. The oocytes are retrieved, fertilized, and the resulting embryos are cultured in vitro. Some of these are then transferred to the mother's uterus in the hope of achieving a pregnancy; the remaining viable embryos may be cryopreserved for future procedures. While transferring multiple embryos to the mother enhances the prospects for success, it also increases the possibility of multiple pregnancies, which are strongly associated with increased maternal morbidity and offspring morbidity and mortality. Thus, it is highly desirable to transfer only one embryo to produce a single healthy child. This requires clinicians to select the best embryos for transfer, which remains challenging.

The current standard of care is to select embryos primarily based on their morphology, by visually examining them under a microscope. Following fertilization, the two pronuclei of an embryo, which contain the father's and mother's DNA, move together and migrate to the center of the embryo. The embryo undergoes a series of cell divisions during the "cleavage" stage. Four days after fertilization, the embryo compacts and the cells firmly adhere to each other, at which time it is referred to as a compact "morula." On the fifth day, the embryo forms a "blastocyst," consisting of an outer layer of cells (the trophectoderm) enclosing a smaller mass (the inner-cell mass). On the sixth day, the blastocyst expands and hatches out of the zona pellucida (the thin eggshell that surrounds the embryo). Clinicians score embryos by manually measuring features such as cell number, cell shape, cell symmetry, the presence of cell fragments, and blastocyst appearance, usually at discrete time points. Recently, many clinics have started to use time-lapse microscopy systems that continuously record movies of embryos without disturbing their culture conditions. However, these videos are typically analyzed manually, which is time-consuming and subjective.

Previous researchers have trained convolutional neural networks (CNNs) to directly predict embryo quality, using either single images or time-lapse videos. However, interpretability is vital for clinicians to make informed decisions on embryo selection, and an algorithm that directly predicts embryo quality from images is not interpretable. Worse, since external factors such as patient age and body-mass index also affect the success of an embryo transfer, an algorithm trained to predict embryo quality may instead learn a representation of confounding variables, which may change as IVF practices or demographics evolve. Some researchers have instead trained CNNs to extract a few identifiable features, such as blastocyst size, blastocyst grade, cell boundaries, or the number of cells when there are four or fewer.

While extracting identifiable features provides interpretability, prior efforts omit key features that are believed to be important for embryo quality. Moreover, they do not achieve full automation, requiring the input images to be manually annotated as in the cleavage or blastocyst stage. Accordingly, there is a need for techniques and systems for automatically evaluating embryo viability and selecting, or assisting in the selection of, high-quality embryos for IVF.

SUMMARY

Embodiments of the present invention use deep learning to automate measurement of key morphokinetic embryo features associated with viability and quality, in particular those relevant for clinical IVF. The term "deep learning" refers to machine-learning algorithms that use multiple layers to progressively extract higher-level features from raw images. Deep learning generally involves neural networks, which process information in a manner similar to the human brain. The network is composed of a large number of highly interconnected processing elements (neurons) working in parallel to solve a specific problem. Neural networks learn by example; they must be properly trained with carefully collected and curated training examples to ensure high levels of performance, reduce training time, and minimize system bias.

CNNs are often used to classify images or identify (and classify) objects pictured in an image scene. In various embodiments, one or more CNNs are trained and used to make the morphokinetic measurements. Systems and methods in accordance with the invention may, for example, acquire one or more digital images of one or more embryos; select one or more embryos in each digital image; and for each selected embryo, (i) computationally identify, using a predictor (such as a CNN) that has been computationally trained to segment the image into a plurality of regions, pixels corresponding to a region inside the embryo well, a region outside the embryo well, a zona pellucida boundary, and/or a region within the zona pellucida boundary. The system or method may then computationally analyze the identified pixels and, based thereon, detect the degree of fragmentation in the embryo and assign thereto a numeric score corresponding to the detected degree of fragmentation. For each embryo with a low fragmentation score, the system or method may computationally classify the embryo's developmental stage based on whether cells constituting the embryo exceed a threshold number (e.g., nine). For an embryo consisting of a single cell, the system or method may detect whether any pronuclei are present in the embryo using a predictor that has been computationally trained to detect pronuclei. Based on these measurements, the system or method may assign a viability score to the embryo. Assigning a viability (or quality) score may involve associating a numeric score with each embryo analyzed or a subset thereof; ranking or binning the analyzed embryos; highlighting (e.g., surrounding with a bounding box or coloring) the best embryo in a digital image showing a plurality of the analyzed embryos; color coding the embryos based on implicit or explicit viability scores; or otherwise discriminating among them.

The embryo regions may be identified by semantic segmentation, which may be performed by a trained CNN, e.g., a fully convolutional network. The degree of fragmentation may also be detected by a trained CNN, e.g., a regression CNN. In various implementations, a plurality of digital images of the embryo(s) is obtained in a time sequence and the embryo's developmental stage is classified over time.

In some embodiments, the method or system may also generate a digital image highlighting the cells constituting each selected embryo if (and, typically, only if) the embryo's developmental stage is below the threshold. The digital image may, for example, be generated by object image segmentation using a trained CNN. Similarly, the embryo's developmental stage may be classified by a trained CNN, and a trained CNN may be used to detect pronuclei. In general, these CNNs may be separate computational entities or a single neural network trained for multi-task learning.

As used herein, the term "substantially" means ±10% by a tissue volume, and in some embodiments, ±5% by a tissue volume. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

The foregoing and the following detailed description will be more readily understood when taken in conjunction with the drawings, in which.

DETAILED DESCRIPTION

Figure 1:
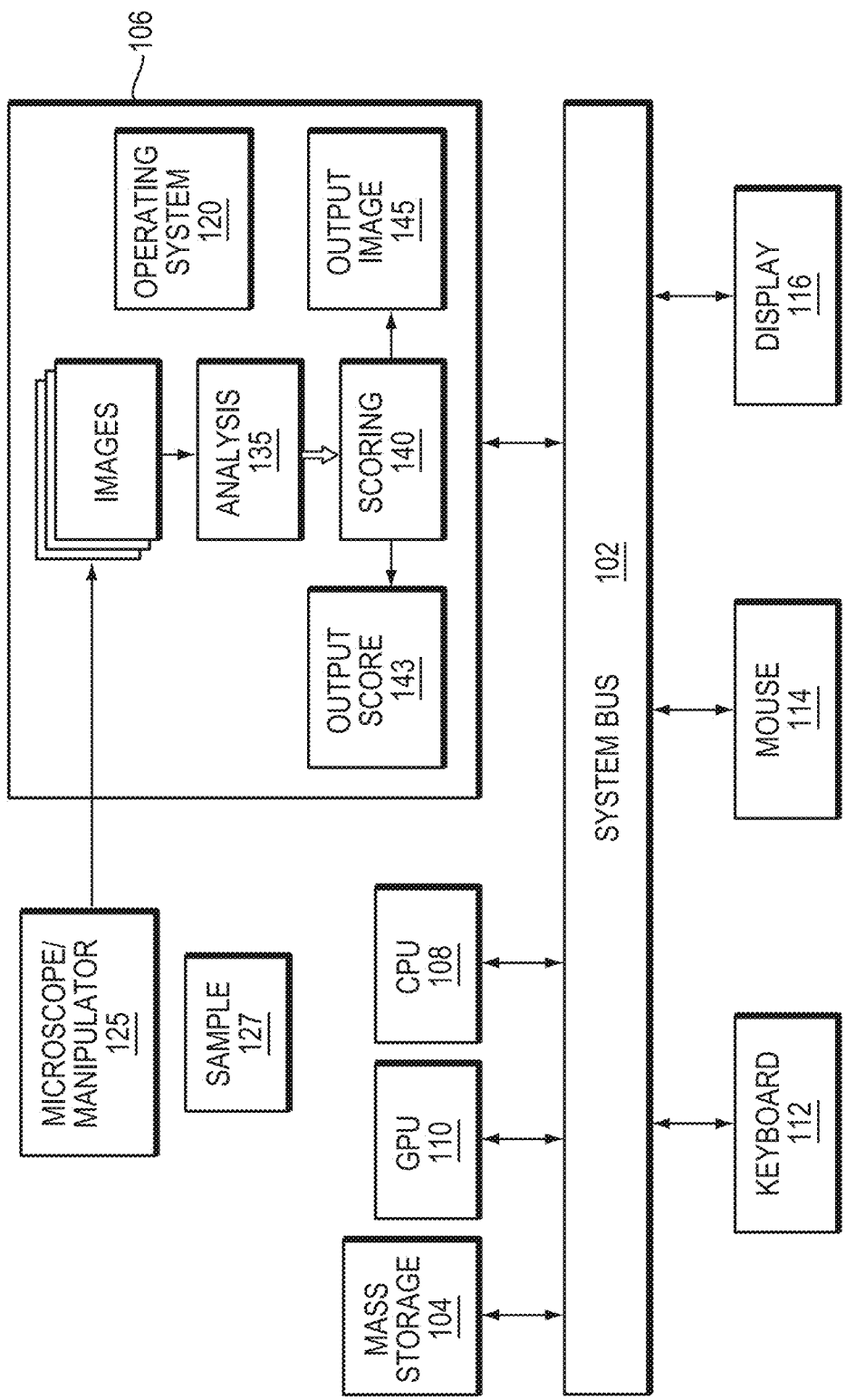
FIG. 1 is a block diagram of a representative architecture for implementing certain embodiments of the invention.

Refer first to FIG. 1, which illustrates a representative system 100 implementing an embodiment of the present invention. As indicated, the system 100 includes a main bidirectional bus 102, over which all system components communicate. The main sequence of instructions effectuating the functions of the invention and facilitating interaction between the user and the system reside on a mass storage device (such as a hard disk, solid-state drive or optical storage unit) 104 as well as in a main system memory 106 during operation. Execution of these instructions and effectuation of the functions of the invention are accomplished by a central processing unit ("CPU") 108 and, optionally, a graphics processing unit ("GPU") 110. The user interacts with the system using a keyboard 112 and a position-sensing device (e.g., a mouse) 114. The output of either device can be used to designate information or select particular areas of a screen display 116 to direct functions to be performed by the system.

The main memory 106 contains instructions, conceptually illustrated as a group of modules, that control the operation of CPU 108 and its interaction with the other hardware components. An operating system 120 directs the execution of low-level, basic system functions such as memory allocation, file management and operation of mass storage devices 104. At a higher level, one or more digital images 122 are received from an image source such as a digital microscope 125 (e.g., the EMBRYOSCOPE system sold by Vitrolife AB, Gobeborg, Sweden), which is used to examine an embryo sample 127. The image 122 may be conventionally preprocessed, if necessary, to reduce noise and resize it (e.g., to 500×500 pixels) for optimal processing by an analysis module 135, whose operation is described in greater detail below. The output of the analysis module 135 may be a plurality of classification probabilities or measures, which are used by a scoring module 140 to produce an output score 143 (e.g., on the display 116) for each analyzed embryo reflecting its viability and/or quality. This may involve displaying a numeric score for each analyzed embryo or a subset thereof (e.g., embryos with viability scores making them suitable IVF candidates), or ranking or binning the analyzed embryos. In some embodiments, the output score is expressed as an output image 145 highlighting (e.g., surrounding with a bounding box or coloring) the best identified embryo or color coding them based on implicit or explicit viability scores. In still other embodiments, one or more high-scoring embryos is isolated autonomously using, for example, a pipetting robot indicated 125.

Figure 2:
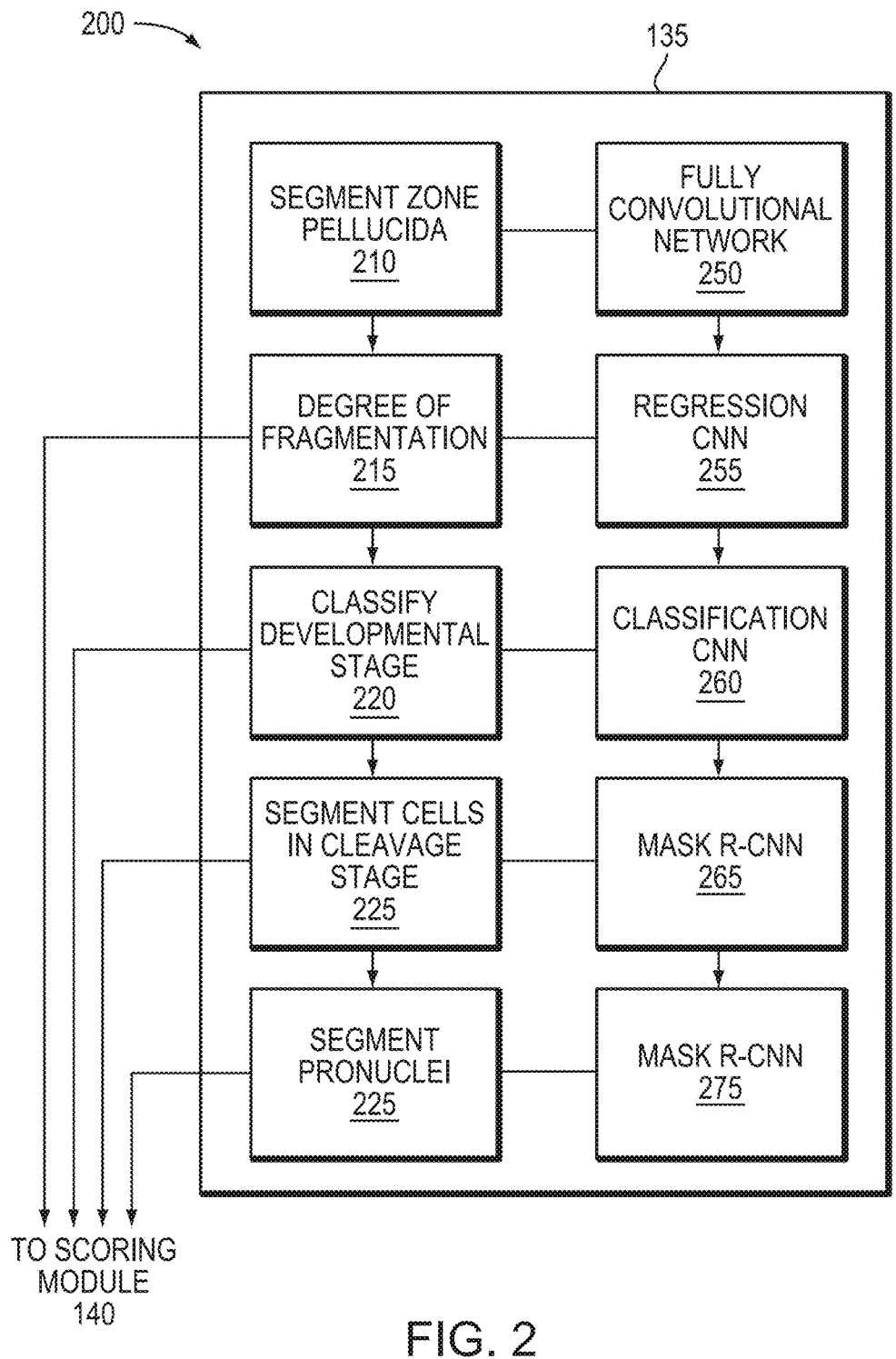
FIG. 2 schematically illustrates an exemplary CNN pipeline in accordance with embodiments of the invention.
Figure 3:
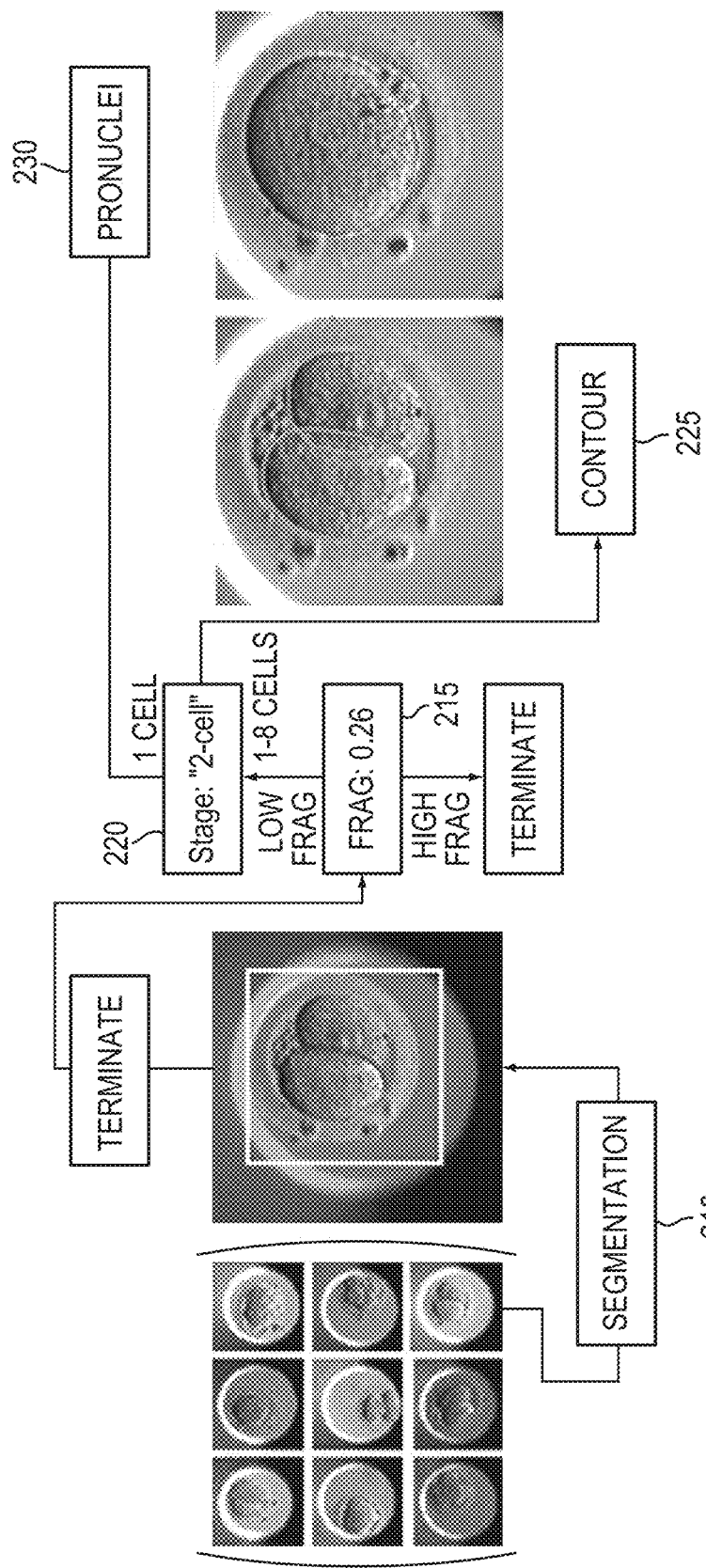
FIG. 3 illustrates operation of the CNN pipeline shown in FIG. 2.

FIGS. 2 and 3 illustrate a representative analysis pipeline and architecture for the analysis module 135. The analysis includes five tasks: segmentation of the zona pellucida (step 210), estimating the degree of embryo fragmentation (step 215), classification of the embryo's developmental stage from single cell to blastocyst (step 220), object instance segmentation of cells in the cleavage stage (step 225), and object instance segmentation of pronuclei before the first cell division (step 230). With the exception of zona pellucida segmentation, all these steps may be used for embryo selection; zona pellucida segmentation both improves performance of the other steps networks and may occasionally inform other IVF procedures.

Segmentation of the zona pellucida may be performed by a fully convolutional network (FCN) 250 based on, for example, the well-known Resnet101 architecture. An FCN takes an input of arbitrary size (here, typically, 500×500 pixels) and produces correspondingly sized output with efficient inference and learning (see, e.g., Long et al., "Fully Convolutional Networks for Semantic Segmentation," arXiv:1411.4038 [cs.CV] (2014), which is hereby incorporated by reference). The FCN 250 may perform semantic segmentation to segment the image 122 into regions corresponding to pixels outside the well, pixels inside the well, the zona pellucida, and the space inside the zona pellucida (the perivitelline space and embryo). The FCN 250 has been trained to predict, for the image 122, a per-pixel class probability for each pixel therein.

For example, training may performed on images obtained with time-lapse microscopy using, e.g., an EMBRYOSCOPE. In one successful implementation, the microscope 125 acquired an image every 20 minutes at seven focal planes and at 15 μm increments; the FCN 250 was trained with images chosen from 203 embryos at 3,618 time points. More generally, the recorded images provide views of the embryo with different amounts of defocus; they do not provide 3D information. The embryos are recorded for three to five days, corresponding to 200-350 images at each focal plane (i.e., 1400-2450 images per embryo), although embryos are occasionally removed from the incubation system for clinical procedures. To train the FCN 250 and other CNNs described below, these images are assembled into a dataset with detailed, frame-by-frame labels for each task. The minimum number of labeled images required for adequate training depends on the task and is straightforwardly determined by those skilled in the art without undue experimentation.

It was found, following training, that the FCN 250 nearly optimally segments a test set of images, taken from 36 embryos at 576 times. In particular, the FCN 250 correctly labels image pixels 96.7% of the time, with per-class accuracies between 93-99%.

In step 210, the segmentation result was used to crop the 500×500 images to 328×328, centered around the embryo, as input for the other steps. The cropped image from the zona pellucida segmentation is analyzed in step 215 to estimate the embryo's degree of fragmentation. Step 215 may be performed, for example, using a regression CNN 255 based on, for example, the well-known InceptionV3 architecture (see, e.g., Szegedy et al., "Rethinking the inception architecture for computer vision," Proceedings of the IEEE conference on computer vision and pattern recognition at 2818-2826 (2016), which is incorporated by reference). The CNN 255 network takes a single-focus image as input and predicts a fragmentation score of 0 (0% cell fragments), 1 (<10%), 2 (10-20%), or 3 (_20%), following clinical practice. In one embodiment, the CNN 255 is trained to minimize the $L_1$ loss on cleavage-stage embryo images. In one experiment, we trained with cleavage-stage images of 989 embryos at 16,315 times, where each image was labeled with an integer score from 0-3. For each time point in the movie we analyzed, we ran the CNN 255 on the three middle focal planes and took the average as the final score. The trained network was found to predict a score with a mean-absolute deviation of 0.45 from the test labels on a fragmentation test set of 216 embryos labeled at 3,652 times.

Counting and identifying cells in fragmented embryos is difficult, inhibiting the labeling of train or test data for these embryos. Moreover, since high fragmentation is strongly correlated with low embryo viability, in standard clinical practice highly fragmented embryos are frequently discarded. Thus, we train the rest of the system on embryos with fragmentation less than 2.

For low fragmentation embryos, the embryo's developmental stage is classified over time in step 220 using, e.g., a classification CNN 260. In one embodiment, the CNN 260 is based on the ResNeXt101 architecture (see, e.g., Xie et al., "Aggregated residual transformations for deep neural networks," Proceedings of the IEEE conference on computer vision and pattern recognition at 1492-1500 (2017), which is incorporated by reference). The classifier takes the three middle focal planes as input and predicts a 13-element vector of class probabilities, with nine classes for cleavage-stage embryos (one each for 1-8 cells and one for ≥9 cells) and one class each for morula (M), blastocyst (B), empty wells (E), and degenerate embryos. To account for inaccuracies in the training data labels, the classifier may be trained with a soft loss function modified from the standard cross-entropy loss $$\log(p(\ell|m)) = \log\left(\sum_t p(\ell|t)p(t|m)\right)$$

where t is the true stage of an image, $\ell$ the (possibly incorrect) label, and m the model's prediction. In one experiment, the quantity p ($\ell$ |t) was measured by labeling 23,950 images in triplicate and using a majority vote to estimate the true label t of each image. This soft-loss differs from regularized loss by differentially weighting classes. Using the measured p($\ell$ |t), we then trained the CNN 260 with 341 embryos labeled at 111,107 times, along with a validation set of 73 embryos labeled at 23,381 times for early stopping. Finally, we applied dynamic programming to the predicted probabilities to find the most-likely non-decreasing trajectory, ignoring images labeled as empty or degenerate. We obtained an accuracy of 87.9% on a test set consisting of 73 embryos labeled at 23,850 times.

For the images identified in step 220 as having 1-8 cells, a Mask R-CNN 265 may be used to perform object instance segmentation on each cell in the image (i.e., step 225). For example, the CNN 265 may be based on the Mask R-CNN architecture and a ResNet50 backbone (see, e.g., He et al., "Mask R-CNN," Proceedings of the IEEE international conference on computer vision at 2961-2969 (2017); He et al., "Deep residual learning for image recognition," Proceedings of the IEEE conference on computer vision and pattern recognition at 770-778 (2016), both of which are incorporated by reference). In one experiment, we used 102 embryos labeled at 16,284 times with 8 or fewer cells; we also used a validation set of 31 embryos labeled at 4,487 times for early stopping. The CNN may take as input a single-focus image cropped from the zona segmentation (step 210), sized to 500×500 pixels. The CNN 265 predicts a bounding box, mask, and confidence score for each detected cell candidate. Both the ground-truth labels and the predicted masks are found to overlap significantly when the embryo has 2-8 cells. A final prediction may be produced by running the CNN 265 on the three central focal planes and merging candidates found across focal planes by using the one with the highest confidence score.

In one experiment, we measured the accuracy of the CNN 265 using mean-average precision (mAP), a standard metric for object-instance segmentation tasks. The CNN 265 was found to predict cell masks with a mAP of 0.737 on a test set consisting of 31 embryos labeled at 4,953 times. The CNN 265 identifies cells with a precision of 82.8% and a recall of 88.4%. For correctly identified candidates, the predicted cell area is within 17% of the true cell area 90% of the time; much of this error arises when cells strongly overlap late in the cleavage stage. Cropping to a region of interest was found to provide a marginal improvement to accuracy.

The pronuclei object-image segmentation (step 230) may use a CNN 270 identical or similar to the CNN 265, e.g., based on the Mask R-CNN architecture and a ResNet50 backbone. In one experiment, the CNN 270 predicted masks with a mAP of 0.680 on a test set of 33 embryos labeled at 2,090 times. The CNN 270 identified pronuclei with a precision of 81.4% and a recall of 88.2%. Much of the false-positive detections were found to arise from vacuoles inside one-cell embryos, which look similar to pronuclei. For correctly identified candidates, the predicted pronuclei area was within 16% of the true pronuclei area 90% of the time. The mAP of the CNN 270 was found to outperform that of a baseline Mask R-CNN by 0.03; averaging across focal planes and cropping to a region-of-interest each improved the mAP by 0.01.

The outputs of steps 215, 220, 225, and 230 may be used for embryo selection, e.g., to assign a viability score to each embryo in a sample. As noted, step 215 may be carried out so as to produce a numeric score, and the vector of class probabilities corresponding to the development stage from step 220 may likewise be used as numeric input for the scoring module 240. The output of steps 225 and 230 may be a predicted or estimated number of cells and pronuclei, respectively, once again providing numeric input for the scoring module 140. The weights applied by the scoring module 140 to these inputs to arrive at an output score 143 and/or output image 145 are straightforwardly determined by those skilled in the art without undue experimentation, and may reflect expert preferences that evolve over time.

It should be stressed that the analysis module 135 may include one or more modules implemented in hardware, software, or a combination of both. For embodiments in which the functions are provided as one or more software programs, the programs (including CNNs) may be coded in any suitable programming language, including, without limitation, high-level languages such as C, C++, C#, Java, Python, Ruby, Scala, and Lua, utilizing, without limitation, any suitable frameworks and libraries such as TensorFlow, Keras, PyTorch, Caffe or Theano. Additionally, the software can be implemented in an assembly language and/or machine language directed to the microprocessor resident on a target device. Furthermore, one or more of the CNNs described above for steps 210, 215, 220, 225, and 230 may instead be a single neural network trained for multi-task learning. See, e.g., Dai et al., "Instance-aware semantic segmentation via multi-task network cascades," Proceedings of the IEEE Conference on Computer Vision and Pattern Recognition at 3150-3158 (2016); and Ruder, "An Overview of Multi-Task Learning in Deep Neural Networks," arXiv: 1706.05098 [cs.LG], both of which are incorporated herein by reference.

The CPU 108 that executes commands and instructions may be a general-purpose computer, but may utilize any of a wide variety of other technologies including a special-purpose computer, a microcomputer, microprocessor, microcontroller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), RFID processor, smart chip, or any other device or arrangement of devices that is capable of implementing the steps of the processes of the invention.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of analyzing one or more living embryos, the method comprising the steps of:
    (a) acquiring one or more digital images of one or more embryos;
    (b) selecting one or more embryos in each digital image;
    (c) for each selected embryo:
        i. computationally identifying, using a predictor that has been computationally trained to segment the image into a plurality of regions, pixels corresponding to (A) a region inside the embryo well, (B) a region outside the embryo well, (C) a zona pellucida boundary, and (D) a region within the zona pellucida boundary;
        ii. computationally analyzing the identified pixels and, based thereon, detecting a degree of cellular fragmentation in the embryo and assigning thereto a numeric score corresponding to the detected degree of cellular fragmentation;
        iii. for each embryo with a low fragmentation score, computationally classifying the embryo's developmental stage based on whether cells constituting the embryo exceed a threshold number;
        iv. only for an embryo consisting of a single cell, detecting whether any pronuclei are present in the embryo using a predictor that has been computationally trained to detect pronuclei; and
        v. based on steps i-iv, assigning a viability score to the embryo.

2. The method of claim 1, further comprising the step of generating a digital image highlighting the cells constituting each selected embryo only if the embryo's developmental stage is less than the threshold.

3. The method of claim 2, wherein the digital image is generated by object image segmentation using a trained convolutional neural network.

4. The method of claim 1, wherein the regions of the embryo are identified by semantic segmentation.

5. The method of claim 4, wherein the semantic segmentation is performed by a trained fully convolutional network.

6. The method of claim 1, wherein the degree of fragmentation is detected by a trained regression convolutional neural network.

7. The method of claim 1, wherein a plurality of digital images of the one or more embryos is obtained in a time sequence and the embryo's developmental stage is classified over time.

8. The method of claim 1, wherein the threshold is 9.

9. The method of claim 1, wherein the embryo's developmental stage is classified by a trained classification convolutional neural network.

10. The method of claim 1, wherein the step of detecting whether any pronuclei are present in the embryo is performed by a trained convolutional neural network.

11. The method of claim 1, wherein at least steps i-iv are performed by a single neural network trained for multi-task learning.

12. A system for analyzing one or more living embryos, the system comprising:
    means for acquiring one or more digital images of one or more embryos; and
    a processor configured to select one or more embryos in each digital image and, for each selected embryo, (i) computationally identify, using a predictor that has been computationally trained to segment the image into a plurality of regions, pixels corresponding to (A) a region inside the embryo well, (B) a region outside the embryo well, (C) a zona pellucida boundary, and (D) a region within the zona pellucida boundary; (ii) computationally analyze the identified pixels and, based thereon, detect a degree of cellular fragmentation in the embryo and assigning thereto a numeric score corresponding to the detected degree of cellular fragmentation; (iii) for each embryo with a low fragmentation score, computationally classify the embryo's developmental stage based on whether cells constituting the embryo exceed a threshold number; (iv) only for an embryo consisting of a single cell, detecting whether any pronuclei are present in the embryo using a predictor that has been computationally trained to detect pronuclei; and (v) based on i-iv, assign a viability score to the embryo.

13. The system of claim 12, wherein the processor is further configured to generate a digital image highlighting the cells constituting each selected embryo only if the embryo's developmental stage is less than the threshold.

14. The system of claim 13, wherein the processor is configured to execute instructions implementing a trained convolutional neural network to generate the digital image by object image segmentation.

15. The system of claim 12, wherein the processor is configured to identify the regions of the embryo by semantic segmentation.

16. The system of claim 15, wherein the processor is configured to execute instructions implementing a trained fully convolutional neural network to generate the semantic segmentation is performed by a trained fully convolutional network.

17. The system of claim 12, wherein the processor is configured to execute instructions implementing a trained regression convolutional neural network to determine the degree of fragmentation.

18. The system of claim 12, wherein the processor is further configured to obtain a plurality of digital images of the one or more embryos in a time sequence and classify the embryo's developmental stage over time.

19. The system of claim 12, wherein the threshold is 9.

20. The system of claim 12, wherein the processor is configured to execute instructions implementing a trained classification convolutional neural network to determine the embryo's developmental stage.

21. The system of claim 12, wherein the processor is configured to execute instructions implementing a trained convolutional neural network to detect whether any pronuclei are present in the embryo.

22. The system of claim 12, wherein at least i-iv are performed by a single neural network trained for multi-task learning.

* * * * *